United States Patent [19]
Takakusaki et al.

[11] Patent Number: 4,790,741
[45] Date of Patent: Dec. 13, 1988

[54] APPARATUS FOR PREPARING HEAT-SET PLASTIC HOLLOW VESSEL

[75] Inventors: Nobuyuki Takakusaki, Yokohama; Yohji Mizutani; Nobuhiro Kishida, both of Tokyo; Manabu Hosokawa, Kawasaki, all of Japan

[73] Assignee: Toyo Seikan Kaisha, Ltd., Tokyo, Japan

[21] Appl. No.: 82,466

[22] Filed: Aug. 7, 1987

[51] Int. Cl.$^4$ .................. B29C 49/36; B29C 49/64
[52] U.S. Cl. ................... 425/526; 425/529; 425/534; 425/535; 425/539; 425/540
[58] Field of Search ............. 425/522, 538, 530, 526, 425/533, 535, 539, 540, 534, 529

[56] References Cited
U.S. PATENT DOCUMENTS

| | | | |
|---|---|---|---|
| 3,103,036 | 9/1963 | Nave et al. | 425/526 |
| 3,520,020 | 7/1970 | Williams et al. | 425/526 |
| 3,599,280 | 1/1968 | Rosenkranz | 425/540 |
| 3,635,624 | 1/1972 | Nakakoshi et al. | 425/526 |
| 3,816,580 | 6/1974 | Valyi | 425/526 |
| 3,842,149 | 10/1974 | Vollers | 425/533 |
| 3,882,213 | 5/1975 | Uhlig | 425/526 |
| 3,940,231 | 2/1976 | Uhlig | 425/526 |
| 3,984,513 | 10/1976 | Mulraney | 425/539 |
| 4,020,137 | 4/1977 | Lachner et al. | 425/533 |
| 4,214,860 | 7/1980 | Klemenhagen et al. | 425/540 |
| 4,233,010 | 11/1980 | Suzuki | 425/540 |
| 4,244,913 | 1/1981 | Ryder | 425/535 |
| 4,299,549 | 11/1981 | Suzuki et al. | 425/540 |
| 4,668,177 | 5/1987 | Gatti | 425/534 |

Primary Examiner—Willard Hoag
Attorney, Agent, or Firm—Sughrue, Mion, Zinn, Macpeak & Seas

[57] ABSTRACT

An apparatus for preparing a drawn heat-set plastic hollow vessel.

1 Claim, 9 Drawing Sheets

APPARATUS FOR PREPARING HEAT-SET PLASTIC HOLLOW VESSEL

BACKGROUND OF THE INVENTION (1) Field of the Invention

The present invention relates to an apparatus for preparing a heat-set plastic hollow vessel. More particularly, the present invention relates to an apparatus for preparing a heat-set plastic hollow vessel, which is biaxially molecularly oriented by drawing, in one mold at a high efficiency.

(2) Description of the Related Art

A biaxially draw-blow-formed vessel of a thermoplastic polyester such as polyethylene terephthalate (PET) has a high transparency and an excellent surface gloss and also has high impact strength, rigidity and gas barrier property required for a bottle. Accordingly, vessels of this type are utilized for bottling various liquids.

However, polyester vessels are defective in that the heat resistance is poor, and when the content is hot-filled, thermal deformation or change of the volume by shrinkage occurs. Accordingly, various proposals have been made for heat-setting a biaxially draw-blowformed vessel after the forming operation.

The heat-setting method is roughly divided into a so-called one-mold method in which the draw-blow forming and heat-setting are carried out in one common mold and a so-called two-mold method in which the draw-blow forming and heat-setting are carried out in different molds.

According to the one-mold method, as disclosed in Japanese Patent Publication No. 6216/84, the draw-blow forming and heat setting are simultaneously carried out in a blow-forming mold, and a relatively long residence time in the mold is necessary for effecting the heat-setting after the draw-blowing operation and the cooling for the withdrawal of a formed hollow vessel and therefore, the manufacturing speed is still low. As the one-mold method, Japanese Patent Application Laid-Open Specification No. 95666/79 proposes a process in which the temperature of the hollow mold is maintained at a highest level within the range where a final hollow formed body can be withdrawn without deformation under no substantial cooling, for example, at 100° C., and high-temperature high-pressure air is blown in a polyester preform and simultaneously, the preform is biaxially drawn. According to this process, the temperature of the mold need not be elevated or dropped, but the heat-setting is effected by heat transferred from the high temperature gas and a relatively long time is necessary for completion of the heat-setting because of the presence of the heat transfer interface. Moreover, the attained resistance to thermal shrinkage is still insufficient.

As the two-mold method, there are known a process in which a formed body obtained by the draw-blow forming disclosed in Japanese Patent Publication No. 56606/85, and a process in which the draw-blow forming and the heat treatment are simultaneously carried out in a primary mold and the formed body is taken out from the primary mold and is blow-formed again in a secondary mold without cooling, as disclosed in Japanese Patent Application Laid-Open Specification No. 53326/82.

However, the two-mold method is defective in that two molds are necessary for the forming and heat-setting operations, the apparatus cost is increased and the number of the manufacturing steps is increased. Therefore, further improvements are desired.

SUMMARY OF THE INVENTION

It is therefore a primary object of the present invention to provide an apparatus in which drawn and heat-set plastic vessels can be continuously prepared with a relatively short residence time in the mold according to the above-mentioned one-mold method.

Another object of the present invention is to provide an apparatus for preparing a heat-set plastic hollow vessel, in which the biaxial draw-blow forming of a preform, the heat-setting of a hollow formed body and the cooling for withdrawal of a product are effectively performed in a single mold according to a predetermined program, that is, without any time loss.

In accordance with the present invention, there is provided an apparatus for preparing a drawn heat-set plastic hollow vessel, which comprises a mandrel for supporting a preform composed of a plastic material and a hollow vessel formed from said preform, a supply zone for mounting the preform on said mandrel, a preheating zone comprising a turret having along the periphery thereof a plurality of supporting seats for supporting said mandrel and a heating mechanism for heating the preform on the mandrel, blow-forming and heat-setting zone comprising a plurality of openable and closable blow-forming and heat-setting molds and a rotary member having along the periphery thereof mandrel supporting members corresponding to said molds, a delivery zone for delivering the mandrel having the preheated preform mounted thereon, which comes from the preheating zone, to the blow-forming and heat-setting zone, a withdrawal zone for withdrawing the mandrel having a blow-formed and heat-set vessel mounted thereon from the blow-forming and heat-setting zone, and an endless delivery passage for passing the mandrel through said supply zone, preheating zone, delivery zone, blow-forming and heat-setting zone, and withdrawal zone in the recited order, wherein the blow-forming and heat-setting zone comprises a mold heated at a heat-setting temperature through the entire course of rotation, a mold opening and closing mechanism for closing the mold after the mold has passed through the delivery zone and opening the mold when the mold arrives at the withdrawal zone, a hollow drawing rod arranged concentrically with the mandrel, which is capable of reciprocating relative to the preform, a first gas passage laid out between the periphery of the drawing rod and the mandrel and leading arranged in the interior of the drawing rod and leading to the interior of the preform through openings distributed in the length direction of the drawing rod, a high-pressure hot air supply mechanism and a hot air discharge mechanism, leading to the first gas passage through an opening-closing valve or a changeover valve, a low-pressure cold air supply mechanism leading to the second gas passage through an opening-closing valve, and an opening-closing control valve for connecting the first gas passage to the high-pressure hot air supply mechanism synchronously with insertion of the preform into the drawing rod to effect the draw-blow forming of the preform and simultaneously confinding hot air in the formed vessel to effect the heat-setting of the formed vessel and for connecting the first gas passage to the hot air discharge mechanism after the heat-setting and connecting the second gas passage to the cold air supply mechanism to effect discharge of hot air and cooling of the vessel.

BRIEF DESCRIPTION OF THE DRAWINGS

FIG. 2-A is an enlarged top view illustrating the mechanism for attaching the preform to the mandrel and dismounting the formed vessel from the mandrel.

FIG. 2-B is a side view illustrating the preform.

FIG. 2-C is a side view illustrating the mandrel in which the preform is inserted.

DETAILED DESCRIPTION OF THE INVENTION

In the apparatus of the present invention, as in the known apparatus, a mandrel for supporting a preform and a hollow vessel during and after the draw-blow forming moves along an endless moving passage which passes through a preheating zone for the draw-blow forming and a draw-blow forming zone, and in the draw-forming blow forming zone, the draw-blow forming of the preform is carried out in an openable and closable mold radially attached to a rotary member by cooperation of a drawing rod inserted into the preform and a high-pressure blown fluid. However, according to the present invention, the draw-blow forming of the preform, the heat setting of the formed hollow vessel and the withdrawal of the heatset hollow vessel from the mold are performed as a series of operation without any loss time.

In the present invention, in order to perform this series of operations efficiently, a mold heated at a heat-setting temperature through the entire course of rotation of the mold is used and a high-temperature and high-pressure gas is used as the fluid for blow-drawing the preform. By the axial drawing of the preform by the drawing rod and the peripheral expansion drawing of the preform by blowing of the high-temperature high-pressure gas, there is obtained a hollow vessel in which the vessel wall is biaxially molecularly oriented. Subsequent to formation of this hollow vessel, the inner face of the formed vessel wall falls in contact with the high-temperature high-pressure gas pressed into the vessel while the outer face of the formed vessel wall falls in contact with the mold surface heated at the high temperature, whereby the oriented vessel wall is heat-set. At the terminal stage of this heat setting, the high-temperature high-pressure gas pressed in the vessel is released, and cold air is blown into the vessel again to effect the cooling for the withdrawal of the heat-set hollow vessel. Finally, the mold is opened and the biaxially molecularly oriented and heat-set hollow vessel is taken out from the mold without shrinkage or deformation.

According to the present invention, supply of the high-temperature high-pressure gas and the low-pressure cooling gas is controlled in the following manner. A first gas passage leading to the interior of the preform is laid out between the periphery of the drawing rod and the mandrel, and a second gas passage leading to the interior of the preform through openings distributed in the length direction of the drawing rod is arranged in the interior of the drawing rod. In the first gas passage, a high-pressure hot air supply mechanism and a hot air discharge mechanism are arranged through an opening-closing valve or a changeover valve, and in the second gas passage, a low-pressure cold air supply mechanism is arranged through an opening-closing valve. For the control of each opening-closing valve or changeover valve, at the start of the draw-blow forming, synchronously with insertion of the drawing rod into the preform, the first gas passage is connected to the highpressure hot air supply mechanism, and after termination of the heat-setting, the first gas passage is connected to the hot air discharge mechanism and the second gas passage is connected to the low-pressure cold air supply mechanism. More specifically, the high-temperature high-pressure gas is first blown into the preform and the draw-blow forming of the preform is performed at an extremely high speed, and furthermore, by continuing application of the high-temperature high-pressure gas to the formed hollow vessel, the heat-setting of the wall of the hollow vessel is advanced rapidly and efficiently. At the terminal stage of the heat-setting, by connecting the first gas passage laid out between the periphery of the drawing rod and the mandrel to the hot air discharge mechanism, the high-temperature highpressure gas confined in the vessel is effectively discharged, and cold air is uniformly blown to the entire inner face of the vessel through many openings distributed in the length direction of the drawing rod and the cooling for taking out the heat-set hollow vessel from the mold is easily accomplished in a short time.

Therefore, according to the present invention, drawn and heat-set plastic vessels can be continuously prepared with a relatively short residence time in the mold by the one-mold method.

The present invention will now be described in detail with reference to an embodiment illustrated in the accompanying drawings.

Figure 1:
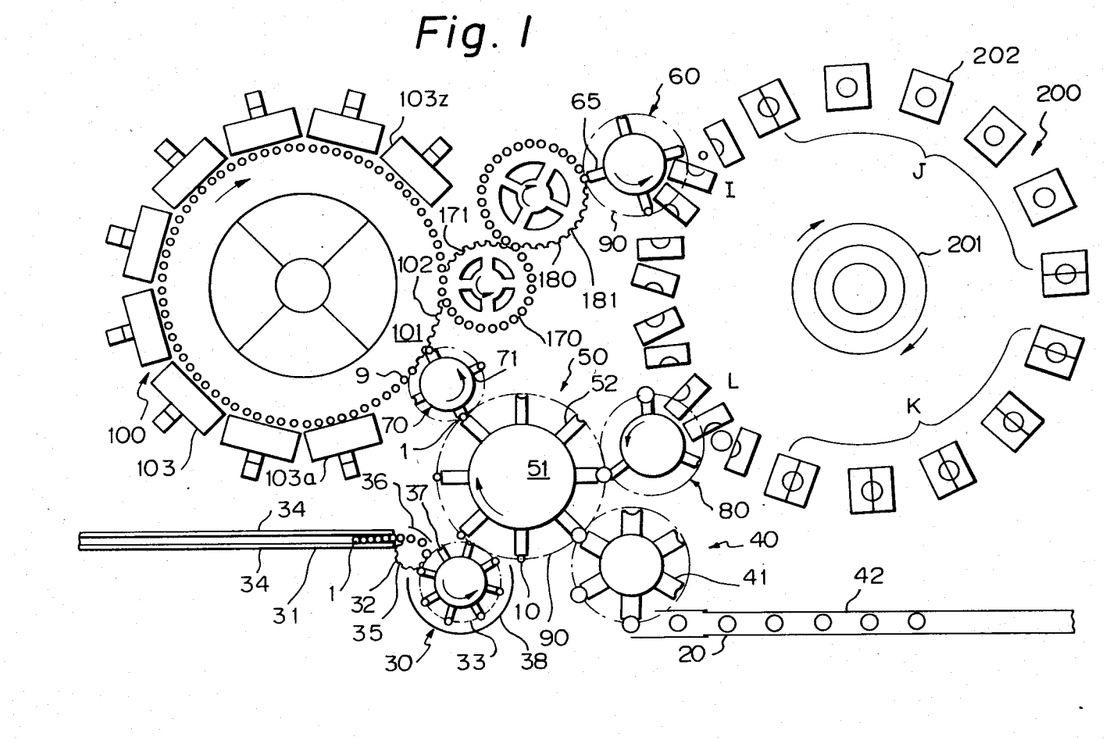
FIG. 1 is a top view illustrating the entire arrangement of the apparatus of the present invention.

Referring to FIG. 1, which is a top view illustrating the entire arrangement of the apparatus of the present invention, this apparatus comprises as main members a supply mechanism (described in detail hereinafter) 30 for supplying a preform 1 composed of a plastic material so that the preform 1 is placed on a mandrel 10, a preheating mechanism 100 for preheating the preform 1 at a drawing temperature, a forming and heat-setting mechanism 200 for draw-blow-forming the preheated preform 1 in a mold and heat-setting a formed hollow vessel 20, and a withdrawal mechanism (described in detail hereinafter) 40 for taking out the formed hollow vessel 20 from the mandrel 10 and withdrawing the formed hollow vessel 20.

A turret-like attaching and dismounting mechanism 50 for mounting the preform 1 on the mandrel 10 and dismounting the hollow vessel 20 from the mandrel 10 is arranged between the preform introduction side of the preheating mechanism 100 and the hollow vessel withdrawal side of the forming and heat-setting mechanism 200. A delivery mechanism 60 for delivering the preheated preform 1 to a mold of the forming and heat-setting mechanism 100 is arranged between the preform discharge side of the pre-heating mechanism 100 and the preform introduction side of the forming and heat-setting mechanism 200. A transfer mechanism 70 for the preform-supporting mandrel is arranged between the turret-like attaching and dismounting mechanism 50 and the preheating mechanism 100, and a transfer mechanism 80 for the hollow vessel-supporting mandrel is arranged between the forming and heat-setting mechanism 100 and the turret-like attaching and dismounting mechanism 30. Accordingly, it will be understood that in an endless delivery passage 90 for the mandrel 10, the turret-like attaching and dismounting mechanism 50, the transfer mechanism 70, the preheating mechanism 100, the delivery mechanism 60, the forming and heat-setting mechanism 200 recited order. Incidentally, turrets 170 and 180 for arranged between the preheating mechanism 100 and the delivery mechanism 60. The functions of these turrets 170 and 180 will be described hereinafter.

Refering to FIG. 2-B illustrating the preform 1, this preform 1 comprises a cylindrical mouth-neck portion 2 having a size and shape corresponding to those of the mouth-neck portion of the final vessel, a cylindrical barrel 3, a closed bottom 4 and a support ring 5 which is formed just below the mouth-neck portion 2.

Figure 3:
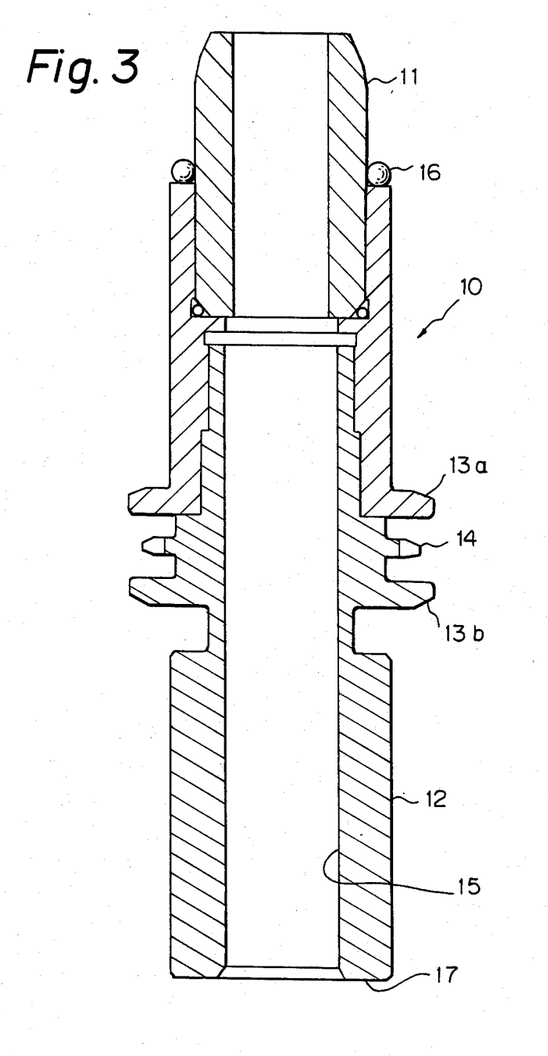
FIG. 3 is an enlarged sectional side view illustrating the mandrel.

Referring to FIG. 3, the mandrel 10 has on the top end thereof an insertion end 11 to be inserted into the mouth-neck portion 2 of the preform 1 and a cylindrical shaft portion 12 in the lower part of the mandrel 10. This cylindrical shaft portion 12 is disposed to hold the mandrel 10 in the delivery mechanism, the preheating mechanism or the forming and heat-setting mechanism. At the central part of the mandrel 10, a gear 14 is disposed between two flanges 13a and 13b to rotate the mandrel 10 in the preheating mechanism. A hollow passage 15 is formed at the center of the mandrel 10 to act as a space for the vertical movement of the drawing rod in the forming and heat-setting mechanism and also as a fluid passage the the draw-blow forming operation and the heat-setting operation. On the lower end of the periphery of the insertion end 11, a sealing O-ring 16 is arranged to produce sealing engagement with the top end of the mouth-neck portion 2 of the preform 1. On the lower end of the cylindrical shaft portion 12 is formed an engaging face 17 to be engaged with a lift member (described in detail hereinafter) for the blow forming in the forming and heat-setting mechanism.

Referring to FIG. 1 again, the preform supply mechanism 30 comprises a supply chute 31, a small turret 32 and a large turret 33. The chute 31 has confronting larger than the diameter of the cylindrical barrel 3 of the preform 1 but smaller than the diameter of the support ring 5. In the portion of the support ring 15' the preform 1 in the erect state slides on the confronting slide plates 34,34 and is supplied to the small turret 32. The small turret 32 has a preformreceiving recess 35 having the above-mentioned distance d, and the preform 1 is supported in the recess 35 by co-operation of a guide 36 and the small turret 32 is rotated clockwise in the drawings. Also the large turret 33 has a preform-receiving recess 37 and supports the preform 1 received from the small turret 32. In this state, the large turret 33 is rotated counterclockwise along a guide 38. Incidentally, the peripheral speeds of the small turret 32 and large turret 33 are made synchronous with the peripheral speed of the attaching and dismounting mechanism 50.

The attaching and dismounting mechanism 50 comprises a rotary member 51 driven and rotated clockwise and a plurality (8 in the drawings) of clamp mechanisms 52 arranged equidistantly on the periphery of the rotary member 51. Referring to FIG. 2-A illustrating the attaching and dismounting mechanism 50 in the enlarged state, each clamp mechanism 52 comprises a pair of openable and closable grippers 54, each having a substantially quadrantal notch 53 on one end, opening-closing driving gear mechanisms 55 formed on the other ends of the grippers 54, a supporting shaft 56, a bracket 57 for rotatably supporting the supporting shaft 56 and a cam follower and gear mechanism 58 for rotating or vertically moving the bracket 57.

A mandrel-supporting rotary member 59 having a diameter larger than that of the rotary member 51 is arranged coaxially with the rotary member 51 below the rotary member 51, and mandrel-supporting recesses 61 corresponding to the clamp mechanisms 52 are arranged on the periphery of the rotary member 59. In the state where the grippers 54 are closed, the central axes of the mandrel-supporting notches 53 and the central axes of the mandrel-supporting recesses 61 are located on the same vertical axes. A magnet 62 is arranged in each mandrel-supporting recess 61 (see FIG. 2-C) to attract and hold the shaft portion 12 of the mandrel 10.

Figure 2:
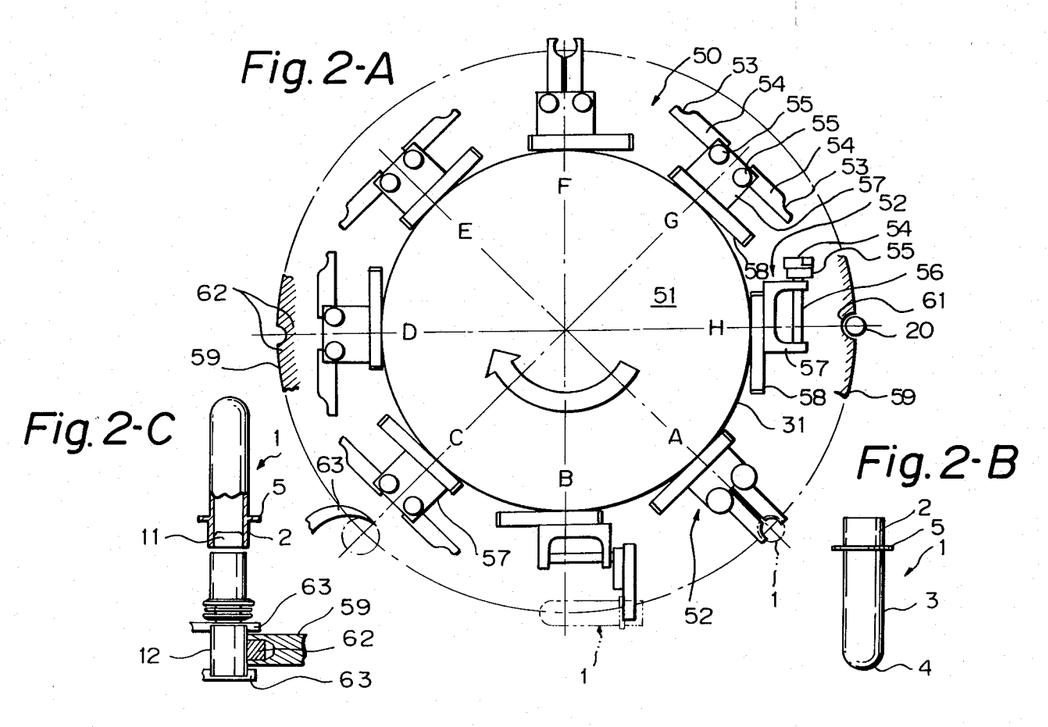

FIG. 2-A shows eight stations A through H of the clamp mechanism 52. The station A is for holding the preform coming from the large turret 33, and at this state, the mandrel 10 is held in the mandrel-supporting recess 61 by the magnet 62 and the grippers 54 are driven by the gear mechanism 55 so that the grippers 54 are closed. Furthermore, the mouth-neck portion 2 of the preform 1 is gripped by the notches 53. As the clamp mechanism 52 moves toward the station B from the station A, the bracket 57 is caused to begin clockwise rotation by the mechanism 58, and with this rotation of the bracket 57, the clamped preform 1 is rotated. The station B in FIG. 2-A shows the state where the preform 1 is rotated by about 90°. While the clamp mechanism 52 moves to the station C from the station B, the bracket 57 continues to rotate, and the rotation is stopped at the point where the preform 1 is rotated by 180°, that is, the preform 1 is inverted. Then, the bracket 57 is brought down by a cam mechanism (not shown) to push the preform 1 in the inverted state into the mandrel 10 located on the same vertical axis as the preform 1, whereby as shown in FIG. 2-C, the insertion end 11 of the mandrel 10 is pushed into the mouth-neck portion 2 of the preform 1 to set the preform 1 at the mandrel 10. In this state, the mandrel 10 is delivered to the station C.

At the station C, the preform-supporting mandrel is transferred to the transfer mechanism 70 (see FIG. 1). The grippers 54 are driven and opened by the gear mechanism 55 to release the preform 1. At the station C, a mandrel-supporting portion 71 of the transfer mechanism 70, which is provided with a magnet, is brought close to the preform-supporting mandrel 9, and the attracting force of this magnet acts on the mandrel 9. A mandrel-separating guide 63 is arranged on the side of the advance direction of the mandrel 9, and the mandrel 9 is moved to the transfer mechanism 70 for the attaching and dismounting mechanism 50. The operations subsequent to the operation at the station C will be described hereinafter.

In the embodiment illustrated in the drawings, the movement of the mandrel in each rotary member is accomplished by the combination of the attracting action of the magnet and the separating guide.

The preform-preheating mechanism 100 comprises a driven and rotated turret 101, mandrel-supporting seats 102 arranged at certain intervals on the periphery of the turret 101, an infrared radiation heating mechanism 103 arranged along the periphery of the turret 101 and a driving mechanism 104 (see FIG. 4) for turning the mandrel on its axis.

Figure 4:
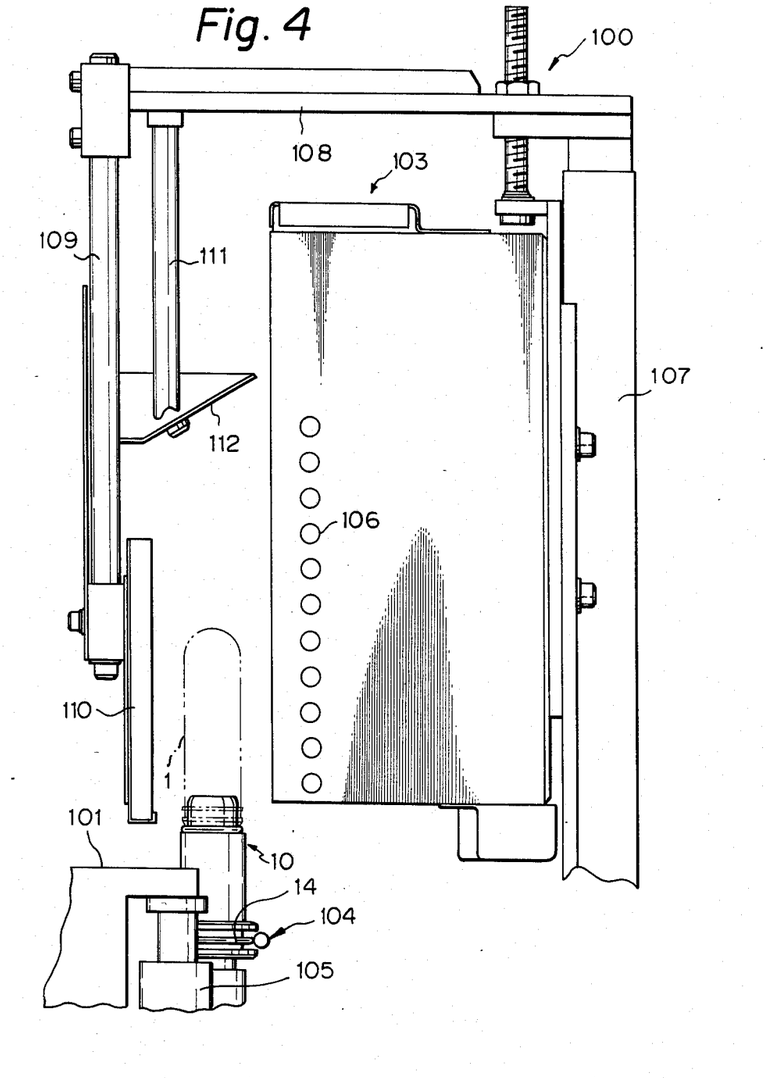
FIG. 4 is an enlarged sectional side view illustrating the preheating mechanism.

Referring to FIG. 4 illustrating this preheating mechanism in the enlarged state, the mandrel 10 supporting the preform 1 thereon is attracted to the mandrel-supporting seat 102 by a magnet (not shown) but the mandrel 10 is turnably held by a roller 105. The driving mechanism 104 for turning the mandrel on its axis consists of a chain engaged with a gear sprocket 14 of the mandrel in the range of from the infrared radiation heating mechanism 103a located most upstream to the infrared radiation heating mechanism 103z located most downstream. Accordingly, by rotation of the turret 101, the preform-supporting mandrel 9 is caused to revolve, and when the driving mechanism 104 is driven, the preform-supporting mandrel 9 is caused to turn on its axis.

The infrared radiation heating mechanism 103 extends in the circumferential direction and comprises infrared radiation units 106 arranged at small intervals in the vertical direction. A row of the infrared radiation units 106 are attached to a machine frame 107 in such a positional relation as corresponding to the cylindrical barrel and bottom of the preform 1. The infrared radiation units 106 are located on the outer side of the row of the preforms 1 and an infrared ray reflecting mirror 110 is arranged on the inner side of the row of the preforms 1 through supporting members 108 and 109. Also an infrared ray-reflecting mirror 112 is arranged above the bottom of the preform through a supporting member 111, so that the preheating of the preform 1 to the drawing temperature can be efficiently performed.

The preform-supporting mandrel 9 is transferred to the mandrel-supporting seat 102 of the preheating mechanism 100 from the transfer mechanism 50, and while the preform 1 moves along the infrared radiation units 106, the preform 1 per se turns on its axis and is preheated at a predetermined temperature. Since infrared radiation heating is effected mainly from the outer face of the preform, there is formed such a temperature gradient that the outer face of the preform is maintained at a relatively high temperature and the inner face of the preform is maintained at a relatively low temperature. Turrets 170 and 180 are disposed to eliminate this temperature gradient and for uniforming in the temperatures of the outer and inner faces of the preform.

The first temperature-uniformalizing turret 170 has a mandrel-supporting seat 171 and the second temperature-uniformalizing turret 180 has a mandrel supporting seat 181. The mandrel carrying thereon the preform heated at a predetermined temperature by the preheating mechanism 100 is shifted to the supporting seat 171 of the first turret 170. After the lapse of a certain time for the temperature adjustment, the mandrel is shifted to the supporting seat 181 of the second turret 181 and the temperature adjustment is conducted for a certain time. During this temperature adjustment, heat is conducted to the inner face from the outer face in the preform 1 and the temperature of the inner face is gradually elevated while the outer face of the preform 1 is gradually cooled, with the result that the temperature of the inner face becomes substantially equal to the temperature of the outer face in the perform with uniform temperature is transferred to the mandrel-supporting portion 65 of the delivery mechanism 60 from the mandrel-supporting seat 181 of the second turret 180 and is then supplied to the forming and heat-setting mechanism 200.

The forming and heat-setting mechanism 200 comprises a rotary member 201, an openable and closable split mold 202 arranged around the rotary member 201 rotatably together with the rotary member 201 and a mold opening and closing member 203 (see FIG. 5) corresponding to the mold 202. A delivery zone I for the preform-supporting mandrel, a draw-blow-forming and heat-setting zone J, a cooling zone K and a withdrawal zone L for the vessel-supporting mandrel are arranged in the recited order in a circular moving passage for the split mold 202. The mold 202 is closed in the draw blow-forming and heat-setting zone J and the cooling zone K, but the mold 202 is opened in the other zones.

Figure 5:
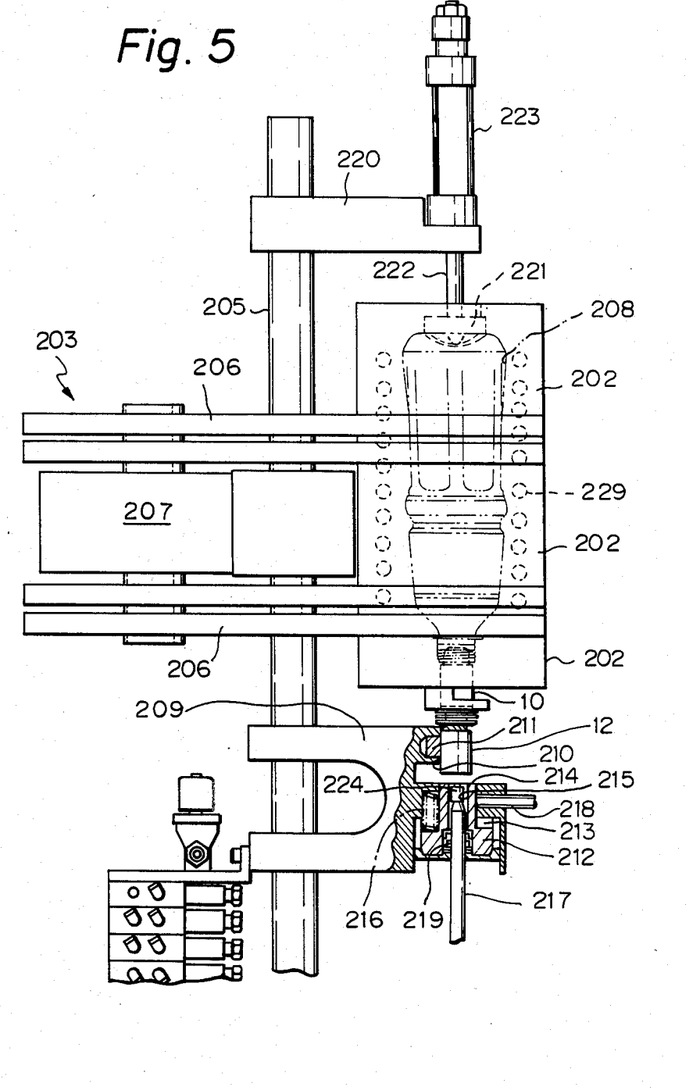
FIG. 5 is an enlarged sectional side view illustrating the forming and heat-setting mechanism.

Referring to FIG. 5 illustrating in detail the forming and heat-setting mechanism 200, a mold opening and closing arm 206 is radially secured to the rotary member 201 and a vertical shaft 205 is secured to a supporting end of the arm 203. The mold opening and closing arm 206 is arranged so that the arm 206 can swing in the horizontal direction with the vertical shaft 205 being the center. The split mold 202 is attached to one end of the mold-opening and mold-closing arm 206, and a fluid pressure cylinder 207 is arranged on the other end of the arm 206 to open and close the split mold 202. A cavity 208 having a size and shape corresponding to those of the final vessel supported on the mandrel is formed in the mold 202.

A mandrel-supporting bracket 209 is secured to a lower part of the vertical shaft 205. A mandrel supporting seat 210 is arranged on the top end of the bracket 209, and a magnet 211 is disposed on the supporting seat 210 to hold the shaft portion 12 of the mandrel 10. A container portion 213 is arranged below the top end of the bracket 209 to support a lift member 212 for the blow-forming so that the lift member 212 can freely move in the vertical direction. The lift member 212 has a sealing face 214 to be engaged with the lower end face of the mandrel 10 and a passage 215 extending in the vertical direction is formed within the lift member 212. The lift member 212 for the blow-forming is always urged downward by a press spring 216 and is moved upward by an electromagnetic valve 245 shown in FIG. 7. A drawing rod 217 is vertically movably arranged in the passage 215 of the lift member 212 for the blow-forming. The vertical movement of the drawing rod 217 is accomplished by an electromagnetic valve 248 shown in FIG. 7.

A clearance acting as a gas passage is formed between the passage 215 of the lift member 212 for the blow-forming and the drawing rod 217, and this clearance is connected to a gas source through a passage 218. The drawing rod 217 and the lift member 212 for the blow-forming are sealed by a seal 219.

At an upper part of the vertical shaft 205, a bottom mold 221 is arranged through a supporting member 220 so that the bottom mold 221 can be moved in the vertical direction by a lift shaft 222. The lift shaft 222 is driven by a fluid cylinder 223 for the vertical movement of the bottom mold, which is arranged on the supporting member 220.

In the state where the split mold 202 is closed, the central axis of the cavity 208 of the mold 202, the center of the bottom mold 221, the center of the mandrel 10 supported on the supporting seat 210, the center of the lift member 212 for the blow-forming and the central axis of the drawing rod 217 are aligned and located on one vertical axis. The drawing rod 217 has an engaging top end 224. The drawing rod 217 is inserted in the preform 1 through the passage 15 of the mandrel 10 and the engaging top end 224 falls in engagement with the inner wall face of the bottom of the preform 1 so that the preform 1 can be drawn in the axial direction.

Figure 6:
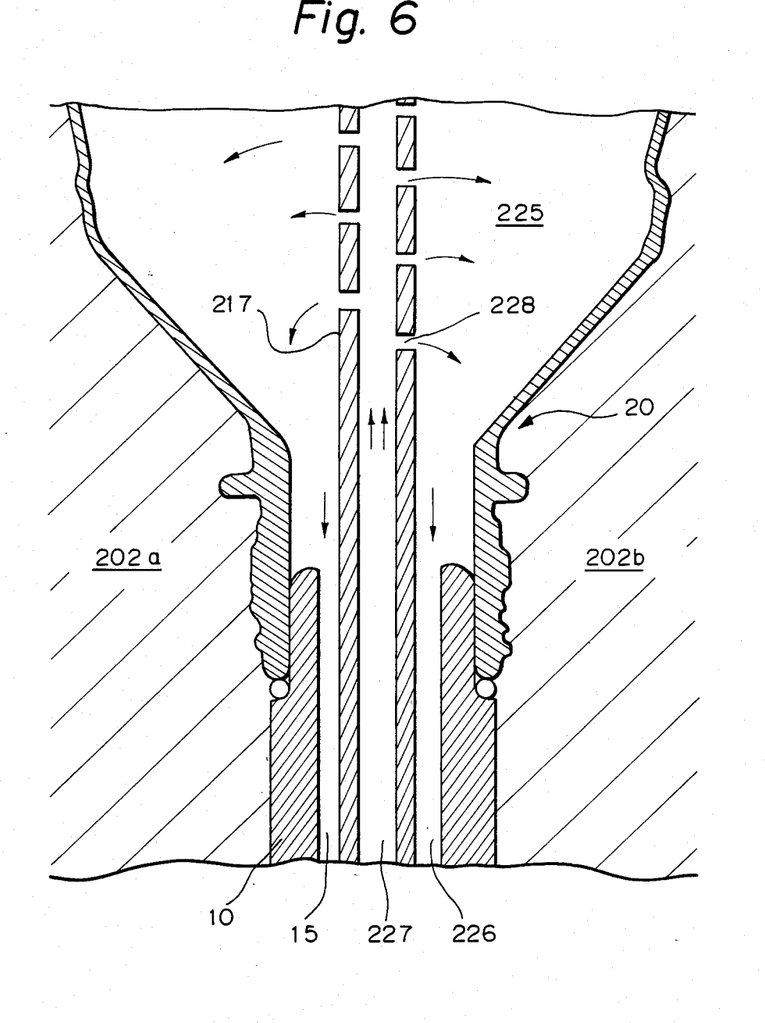
FIG. 6 is an enlarged sectional view illustrating the sectional structure of the drawing rod relatively to the mandrel.

Referring to FIG. 6 illustrating the sectional structure of the drawing rod relatively to the mandrel, a first gas passage 226 leading to an inner space 225 of the preform or vessel is formed around the drawing rod 217 in the passage 15 of the mandrel 10. This first gas passage 226 is connected to the passage 218 through the passage 215 of the lift member. The drawing rod 217 is hollow to form a second gas passage 227. This gas passage 227 leads to the inner space 225 of the preform or vessel through openings 228 distributed in the length direction of the drawing rod 217. The first gas passage 226 is connected to the high-pressure hot air supply mechanism and hot air discharge mechanism, described hereinafter, through an opening-closing valve or changeover valve, while the second gas passage 227 is connected to the low-pressure cold air supply mechanism through an opening-closing valve.

In the apparatus of the present invention, the surface of the cavity 208 of the mold 202 is heated through the entire course of rotation of the mold 202 by an electric heater mechanism 229 arranged in the mold 202 so that the surface of the cavity 208 is maintained at the heat-setting temperature.

Figure 7:
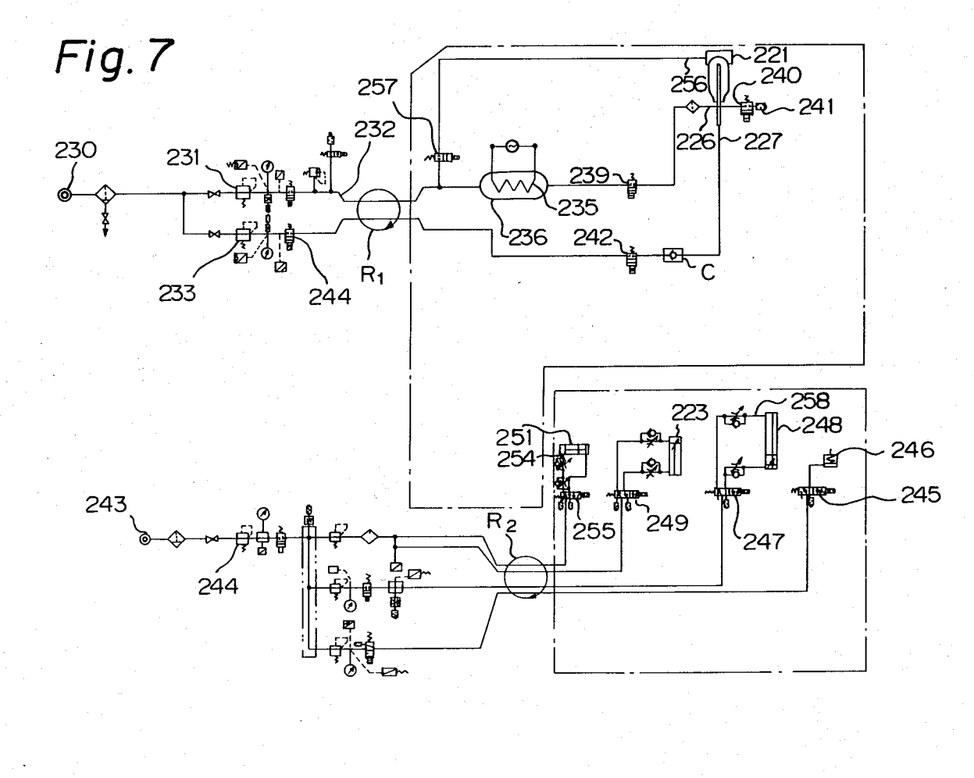
FIG. 7 is a systematic diagram illustrating the control mechanism for the draw-blow forming and heatsetting mechanism.

In FIG. 7 illustrating the control mechanism of the blow-forming and heat-setting mechanism 200, symbols B, C, R and S represent an electromagnetic valve, a check valve, a rotary joint and a throttle valve, respectively. Referring to FIG. 7, a high-pressure air source 230 (the maximum pressure is, for example, 40 kg/cm$^2$) is divided into a relatively high-pressure blowing air source 232 through a pressure-reducing valve 231 and a relatively low-pressure cooling air source 234 through a pressure-reducing valve 233. The high-pressure blowing air source 232 is connected to a rapidly heating tank 236 provided with an electric heater mechanism 235. The rapidly heating tank 236 is connected to the first gas passage 226 through a main blowing electromagnetic valve 239. The first gas passage 226 is connected to an exhaust opening 241 through a gas-discharging electromagnetic valve 240.

The low-pressure cooling air source 234 is connected to the second gas passage 227 through a vessel-cooling electromagnetic valve 242.

Separately from the high-pressure air source, a low-pressure air source 243 for driving the respective fluid cylinders is disposed and connected to the respective cylinders through a pressure-adjusting valve 244 and the rotary joint R. More specifically, the low pressure air source 243 is connected to a lift cylinder 246 for the blow-forming lift member through an electromagnetic valve 245 for sealing the mandrel, to a lift cylinder 248 for the drawing rod through an electromagnetic valve 247 for the drawing and to a lift cylinder 223 for the bottom mold through an electromagnetic valve 249 for the bottom mold.

A cylinder 251 for opening and closing the mold is connected to the cylinder-driving low-pressure air source 243 through an opening and closing electromagnetic valve 255.

In order to facilitate the parting of the heat-set vessel from the bottom mold 221, an air-blowing pipe 256 is arranged in the bottom mold 221, and this pipe 256 is connected to the high-pressure blowing air source 232 through an electromagnetic valve 257 for parting the vessel from the mold.

In the apparatus of the present invention, the blow-forming and heat-setting are performed through the following operations.

(1) Supply

At the station I shown in FIG. 1, the mold 202 is opened, the mold 221 is located at the drop position, and the blow-forming lift mechanism 212 is located at the drop position. The mandrel 10 carrying thereon the preform preheated at the drawing temperature is held on the mandrel-supporting seat 210.

(2) Preparation for Forming Operation

The changeover valve 249 for the bottom mold is turned on and the cylinder 223 for the vertical movement of the mold brings down the bottom mold 221 and stops at the drop position. The mold opening and closing electromagnetic valve 255 is changed over and the cylinder 251 for opening and closing the mold begins the closing stroke to close the mold 202. Then, the electromagnetic valve 245 for sealing the mandrel is changed over and the lift cylinder 246 raises the blow-forming lift member 212 to keep the sealing state of the mandrel 10.

(3) Blow-Forming and Heat-Setting

At the station J shown in FIG. 1, the drawing electromagnetic valve 247 is turned on, and the cylinder 248 makes the rising movement and the drawing rod 217 rises. Thus, the preform 1 is drawn in the axial direction. Simultaneously, the main blowing electromagnetic valve 239 is changed over and high-temperature high-pressure air is blown into the preform through the first passage 226 to expand and draw the preform in the circumferential direction.

The mold 202 is heated at the heat-setting temperature, and the biaxially molecularly oriented vessel wall falls in contact with the cavity surface of the mold 202 to effect the heat-setting. Application of high-temperature high-pressure air into the vessel 20 through the passage 226 is continued and the heat setting of the vessel 20 is promptly accomplished.

(4) Cooling

At the station K shown in FIG. 1, the draw-blow-formed vessel 20 which has been heat-set in the mold 202 for a predetermined time is cooled for the withdrawal from the mold. At first, the blowing electromagnetic valve 239 is changed over to shut the passage and the air-discharging electromagnetic valve 240 is opened, and the vessel-cooling electromagnetic valve 242 is opened. Accordingly, as shown in FIG. 6, relatively low-pressure cooling air is blown to the molecularly oriented and heat-set vessel through the second gas passage 227 within the drawing rod 217 and the openings 228 formed in the drawing rods 217. High-temperature air confined in the space 225 in the vessel and cooling air blown to the vessel wall are promptly discharged to the outside through the first gas passage 226 around the drawing rod and the exhaust opening 241.

(5) Withdrawal

The vessel which has been cooled to such an extent that deformation of the vessel wall is prevented is finally taken out from the mold at the station L shown in FIG. 1. More specifically, at first, the vessel cooling electromagnetic valve 242 is closed, and then, the mandrel-sealing electromagnetic valve 245 is changed over. The lift member 212 for the blow forming is returned to the drop position by the spring 216 (see FIG. 5). Then, the mold opening and closing electromagnetic valve 255 and the drawing electromagnetic valve 247 are changed over and the cylinder 251 is actuated to open the mold. Simultaneously, the cylinder 248 is actuated to drop the drawing rod 217 and stop the drawing rod 217 at the position shown in FIG. 5. Incidentally, it is preferred that cooling of the interior of the vessel, described in (4) above, be conducted at least to the point of the opening of the mold. Then, the gas-discharging electromagnetic valve 240 is closed.

The electromagnetic valve 249 for the bottom mold is changed over and the cylinder 223 makes the rising movement to raise the bottom mold 221. Simultaneously, the electromagnetic valve 257 for parting the vessel from the mold is changed over, and high-pressure air is blown to the bottom of the vessel and the parting of the vessel from the mold can be performed very smoothly.

At the withdrawal zone L shown in FIG. 1, the mandrel 10 carrying thereon the drawn and heat-set vessel 20 is transferred to the transfer mechanism 80 and supplied to the attaching and dismounting mechanism 50.

Referring to FIG. 2-A again, the clamp mechanism 52 in which the grippers 54 are opened at the station C passes through the stations D and E and arrives at the station F for receiving the vessel-carrying mandrel. More specifically, at the station F, the vessel-carrying mandrel 10 is supported in the mandrel-supporting recess 61. The grippers 54 are driven and closed to hold the mouth-neck portion 2 of the vessel 20 by the notches 53. As the clamp mechanism 52 moves to the station G from the station F, the clamp mechanism 52 rises, whereby the vessel 20 is separated from the mandrel 10.

Referring to FIG. 1, the withdrawal mechanism 40 for the vessel 20 comprises a vessel-turning mechanism 41 and a vessel-delivering mechanism 42. The vessel-turning mechanism 41 is disposed to turn the vessel in the inverted state to the erect state and is the same as the clamp mechanism shown in FIG. 2-A except that the mechanism 41 is not provided with a mandrel-supporting mechanism.

Figure 8:
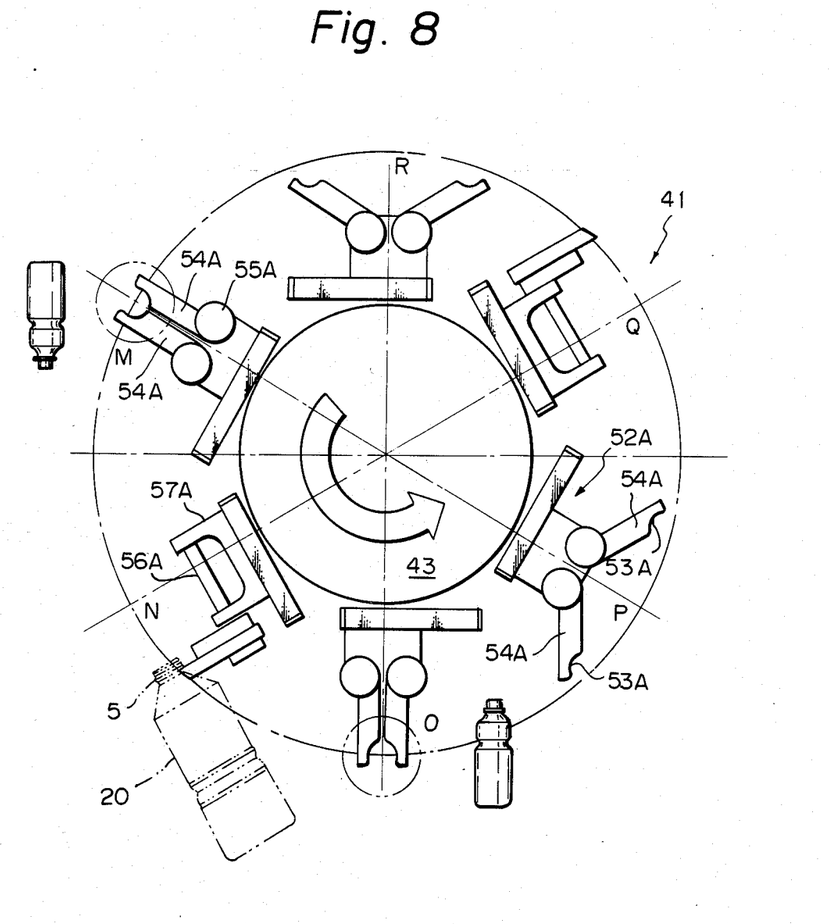
FIG. 8 is an enlarged to view illustrating the vessel-turning mechanism.

Referring to FIG. 8 illustrating this vessel-turning mechanism, a rotary member 43 has many clamp mechanisms 52A arranged on the periphery thereof. Respective members of each clamp mechanism 52A are represented by reference numerals common to those of the members shown in FIG. 2-A while adding affix A. The vessel-turning mechanism 41 has six stations M through R. The station M is for clamping the vessel and corresponds to the station G of the attaching and dismounting mechanism 50. Namely, at the station G of the attaching and dismounting mechanism 50, the grippers 54 are still closed, and in this state, grippers 54A of the turning mechanism 41 are closed to hold the lower part of the supporting ring 5 of the vessel 20. Then, by opening the grippers 54 of the attaching and dismounting mechanism 50, the vessel 20 is transferred to the turning mechanism 41.

The vessel 20 is in the inverted state at the station M of the turning mechanism 41. Then, as the turning mechanism 41 is rotated counterclockwise, a bracket 57A begins to rotate clockwise. At the station N, the vessel 20 is in the state where it is turned by about 90°, and at the station 0, the vessel 20 is in the state where it is turned by 180°, that is, in the erect state. At this station 0, the grippers 54A are opened and the vessel 20 is delivered onto a delivery conveyor 42, and the vessel 20 is fed to an inspecting zone, a packaging zone or the like. The clamp mechanism 52A is further turned by 180°. while it passes through the stations P, Q and R, and the clamp mechanism 52A arrives at the station M.

Figure 9:
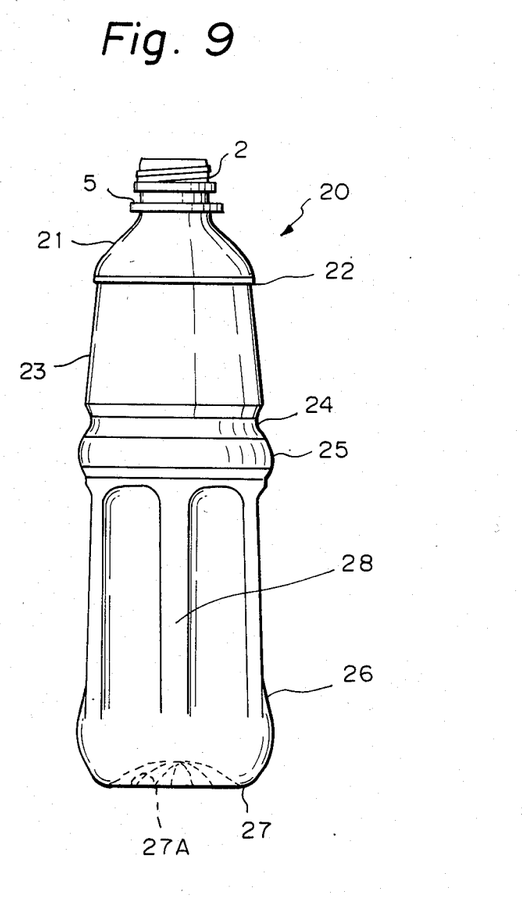
FIG. 9 is a front view illustrating an example of the vessel prepared by the apparatus of the present invention.

Referring to FIG. 9 illustrating an example of the drawn and heat-set hollow vessel prepared by the apparatus of the present invention, this vessel 20 is a PET bottle suitable for hot-filling of a drink such as fruit juice, vegetable juice or tea, and the vessel 20 comprises a screwed mouth-neck portion 2, a support ring 5, a conical shoulder 21, an upper barrel part 23 connected to the shoulder 21 through a circumferential stepped portion 22, a lower barrel part 26 connected to the upper barrel part 23 through a circumferential concave portion 24 and a circumferential convex portion 25, and a bottom 27. A plurality of convexities 28 having a relatively large diameter and a short circumferential length and extending in the direction of the height and a plurality of panel-like convexities 29 having a relatively small diameter and a long circumferential length are arranged alternately in the circumferential direction at the lower barrel part 26.

The panel-like convexities 29 exert a function of moderating the change of the inner pressure by outward expansion on the increase of the inner pressure or inward shrinkage on the decrease of the inner pressure. The circumferential concave portion 24 and circumferential convex portion 25 exert a function of allowing a certain deformation in the axial direction of the vessel. An inwardly concave, star-shaped portion 27A is formed at the center of the bottom 27 to prevent outward buckling by the pressure or thermal deformation.

According to the present invention, the respective portions of the vessel are effectively heat-set, and at the hot-filling step, thermal deformation is effectively prevented at the respective parts of the vessel. Accordingly, the functions of the respective portions of the vessel are effectively exerted and maintained at the hot-filling step and subsequent cooling step and even after the lapse of time, and irregular deformation of the vessel, which degrades the appearance characteristics of the vessel, can be prevented.

The apparatus of the present invention can be used for the production of various drawn heat-set plastic vessels, and the apparatus of the present invention is advantageously applied to the production of a drawn heat-set plastic vessel composed of a thermoplastic polyester.

In the present invention, as the thermoplastic polyester, there are used thermoplastic polyesters composed mainly of ethylene terephthalate units, such as PET and so-called modified PET formed by incorporating as the glycol component a mall amount of other glycol such as hexahydroxylylene glycol or as the dibasic acid component a small amount of other dibasic acid such as isophthalic acid or hexahydrophthalic acid. The thermoplastic polyester may be used singly or in the form of a blend with other resins such as a nylon, a polycarbonate or a polyacrylate.

It is preferred that the inherent viscosity of the thermoplastic polyester used be at least 0.67 dl/g and the diethylene glycol unit content be lower than 2.0% by weight.

The bottomed preform used for the draw-blow forming is prepared according to a known method such as injection molding or pipe extrusion molding. According to the former method, a molten polyester is injected and a bottomed preform having a mouth-neck portion, which corresponds to that of the final vessel, is prepared in the amorphous state. The latter method is advantageous for preparing a bottomed preform comprising a gas barrier intermediate resin layer composed of, for example, an ethylene/vinyl alcohol copolymer. According to this method, an extruded amorphous pipe is cut, a mouth-neck portion is formed on one end of the cut pipe, and the other end is closed to form a bottomed preform. In order to maintain a good engaging and sealing state with a lid at a high temperature, only the portion to be formed into the mouth-neck portion of the vessel may be heat-crystallized in advance. Of course, this heat recrystallization can be carried out at an optional subsequent stage.

The preheating temperature for the preform is the socalled drawing temperature, and in case of PET, this temperature is in the range of from 80° to 120° C., especially from 90° to 110° C. The apparatus of the present invention is advantageously applied to the highspeed draw-forming and heat-setting of the preform, and in case of the high-speed draw-forming and heat-setting, the draw ratio of the inner face of the preform is not so high as the draw ratio of the outer face of the preform. Accordingly, it is preferred that the temperature of the inner face of the preform is not much lower than the temperature of the outer face and that the difference between the temperatures of the inner and outer faces of the preform be less than 10° C., especially less than 5° C.

In the present invention, the temperature of the mold is set at a level at which the heat-setting of the biaxially drawn vessel can be effectively accomplished. This temperature depends greatly on the degree of the heat resistance required for the vessel, but it is preferred that the mold temperature be at the highest level within the temperature range where the vessel can be taken out from the mold without any deformation with a relatively short cooling time. Namely, it is preferred that the mold temperature be 100° to 180° C., especially 120° to 150° C.

Air heated at a temperature higher than the temperature of the preform is used as high-temperature high-pressure blowing air. In view of the efficiency of the high-speed drawing and heat setting, air heated at 100° to 150° C., especially 110° to 140° C., is advantageously used. In view of the efficiency of the high-speed drawing and heat-setting, it is preferred that the pressure be adjusted to 10 to 50 kg/cm$^2$ (gauge), especially 25 to 30 kg/cm$^2$ (gauge). Air at room temperature is supplied under a pressure of 10 to 30 kg/cm$^2$ (gauge), especially 15 to 25 kg/cm$^2$ (gauge), as cooling air.

It is preferred that the draw ratio in the axial direction be 1.2 to 3.0, especially 1.5 to 2.5, and the draw ratio in the circumferential direction be 2 to 5, especially 2.5 to 4.5.

When the apparatus of the present invention is used, a biaxially drawn and heat-set hollow vessel can be prepared by using a single mold with a relatively short residence time in the mold. The time for the draw-blow forming in the mold is ordinarily 0.5 to 3 seconds and especially 1 to 2 seconds. The heat-setting time is ordinarily 3 to 15 seconds and especially 4 to 8 seconds. The cooling time is ordinarily 3 to 15 seconds and especially 4 to 8 seconds.

In order to effectively utilize the internal friction of the preform, it is preferred that the drawing speed in the axial direction be a draw ratio of at least 2.5, especially at least 3.0, per second, and the drawing speed in the circumferential direction be a draw ratio of at least 4.5, especially at least 5.0, per second.

According to the apparatus of the present invention, a biaxially drawn and heat-set vessel can be efficiently prepared by the one-mold method with a short residence time in the mold.

Furthermore, since the temperature of the preform is relatively high and hot air heated at a temperature higher than the temperature of the preform is blown under pressure into the preform, the high-speed draw-blowing becomes possible, and spontaneous heat generation considered to be due to the internal friction and crystallization of the polyester is caused by this high-speed draw-blowing. Accordingly, the temperature of the preform being draw-blow-formed is further elevated and moderation of the strain and crystallization are promoted, with the result that the heat-setting can be efficiently accomplished in a short time.

The highest temperature at which the draw-blow-formed and heat-set vessel can be withdrawn without any substantial deformation in the one-mold method tends to rise as the heat-setting temperature rises. In the apparatus of the present invention, the heat-setting is carried out at a relatively high temperature, as pointed out above, and the changeover of the heat-setting operation to the cooling operation can be accomplished very promptly without any loss time. Therefore, the time required for cooling the heat-set vessel is advantageously shortened according to the present invention.

We claim:

1. An apparatus for preparing a drawing heat-set plastic hollow vessel, which comprises
   a mandrel for supporting a preform composed of a plastic material and a hollow vessel formed from said preform,
   a supply zone for mounting the preform on said mandrel,
   a preheating zone comprising a turret having along the periphery thereof a plurality of supporting seats for supporting said mandrel and a heating mechanism for heating the preform on the mandrel,
   a blow-forming and heat-setting zone comprising a plurality of openable and closable blow-forming and heat-setting molds and a rotary member having along the periphery thereof mandral supporting members corresponding to said molds,
   a delivery zone for delivering the mandrel having the preheated preform mounted thereon, which comes from the preheating zone, to the blow-forming and heat-setting zone,
   a withdrawal zone for withdrawing the mandrel having a blow-formed and heat-set vessel mounted thereon from the blow-forming and heat-setting zone, and
   an endless delivery passage for passing the mandrel through said supply zone, preheating zone, delivery zone, blow-forming and heat-setting zone and withdrawal zone in the recited order.

the improvement wherein the blow-forming and heat-setting zone comprises a mold including means for heating said mold at a heat-setting temperature through the entire course of rotation, a mold opening and closing mechanism for closing the mold after the mold has passed through the delivery zone and opening the mold when the mold arrives at the withdrawal zone, a hollow drawing rod arranged concentrically with the mandrel, which is capable of reciprocating relatively to the preform, a first gas passage laid out between the periphery of the drawing rod and the mandrel and leading to the interior of the perform, a second gas passage arranged in the interior of the drawing rod and leading to the interior of the preform through openings distributed int the length direction of the drawing rod, a high-pressure hot air supply mechanism as a fluid for blow-drawing the preform a hot air discharge mechanism, leading to the first gas passage through an opening-closing valve or a changeover valve, a low-pressure cold air supply mechanism leading to the second gas passage through an opening-closing valve, and an opening-closing control valve for connecting the first gas passage to the high-pressure hot air supply mechanism synchronously with insertion of the preform into the drawing rod to effect the draw-blow forming of the preform and simultaneously confining hot air in the formed vessel to effect the heat-setting of the formed vessel and for connecting the first gas passage to the hot air discharge mechanism after the heat-setting and connecting the second gas passage to the cold air supply mechanism to effect discharge of hot air and cooling of the vessel.

* * * * *